(12) United States Patent
Liu

(10) Patent No.: US 11,968,113 B1
(45) Date of Patent: Apr. 23, 2024

(54) COMPUTING POWER ROUTING METHODS, APPARATUS, ELECTRONIC DEVICES AND STORAGE MEDIA

(71) Applicant: Beijing University of Posts and Telecommunications, Beijing (CN)

(72) Inventor: Yang Liu, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 18/450,407

(22) Filed: Aug. 16, 2023

(30) Foreign Application Priority Data

Nov. 1, 2022 (CN) .......................... 202211353338.6

(51) Int. Cl.
  *H04L 45/12* (2022.01)
  *H04L 45/302* (2022.01)
  *H04L 45/74* (2022.01)

(52) U.S. Cl.
  CPC .......... *H04L 45/127* (2013.01); *H04L 45/306* (2013.01); *H04L 45/74* (2013.01)

(58) Field of Classification Search
  CPC ...... H04L 45/127; H04L 45/306; H04L 45/74
  See application file for complete search history.

(56) References Cited

U.S. PATENT DOCUMENTS

| | | | | |
|---|---|---|---|---|
| 2016/0080245 A1* | 3/2016 | Fang | ...................... | H04L 45/04 370/392 |
| 2017/0155738 A1* | 6/2017 | Dong | ...................... | H04L 67/02 |
| 2022/0200898 A1* | 6/2022 | Zheng | ...................... | H04L 9/50 |
| 2023/0269164 A1* | 8/2023 | Zheng | ..................... | H04L 45/02 370/254 |
| 2023/0275834 A1* | 8/2023 | Huang | .................... | H04L 45/76 370/392 |

FOREIGN PATENT DOCUMENTS

WO   WO-2022222550 A1 * 10/2022

OTHER PUBLICATIONS

WO_2022222550_A1_Huang English translation (Year: 2022).*

* cited by examiner

*Primary Examiner* — Chi H Pham
*Assistant Examiner* — Weibin Huang

(57) ABSTRACT

The present invention provides a method, apparatus, electronic device and storage medium for computing power routing, wherein the method includes: receiving a packet which comprises an IP message; inserting network information of a first switching device in the IP message and re-encapsulating it to obtain an encapsulated packet; a second switching device collecting network information in the encapsulated packet and sending the network information to a controller; subscribing to computing power resource information and sending the information to the controller; constructing a global network topology diagram which includes multiple nodes; planning a general routing table for each node with the network information; planning a computing power routing table for each node with the network information and the computing power resource information; matching a destination routing path for the packet with a request type, wherein the path is determined according to the general routing table or the computing power.

15 Claims, 6 Drawing Sheets

Sort the first target optional paths according to the link tolerance of each first target optional path from large to small, where the link tolerance is the capacity of the smallest edge in the first target optional path — 310

Use the top-ranked first destination optional path as the destination routing path that matches the data packet to be forwarded — 320

COMPUTING POWER ROUTING METHODS, APPARATUS, ELECTRONIC DEVICES AND STORAGE MEDIA

TECHNICAL FIELD

The present invention relates to the technical field of communication networks and, in particular, to a computing power routing method, apparatus, electronic device and storage medium.

BACKGROUND

With the rapid development of technologies such as IoT, cloud computing and edge computing, computing power is becoming one of the resources in the network with the same importance as bandwidth and throughput.

However, with the widespread deployment of computing power resources, their scheduling and routing mechanisms have become more and more complex. On the one hand, streaming-based content requests require routing paths to local or neighboring CDN nodes as much as possible; on the other hand, computing-power-centric routing requests require routing paths to computing power nodes that meet business requirements as much as possible, which leads to a divergence between routing mechanisms for content and computing power services.

SUMMARY

The present invention provides a computing power routing method, device, electronic device and storage medium for solving the defects of divergence among routing mechanisms in the prior art, and realizes that the collaborative scheduling of computing power resources within the network can be ensured without affecting the content service.

The present invention provides a computing power routing method applied to a computing power routing scenario, wherein the computing power routing scenario includes at least a first switching device, a second switching device, a core switching device, a controller, and a computing power cluster, the computing power routing method includes: receiving a packet to be forwarded, wherein the packet to be forwarded comprises an IP message; inserting network information of the first switching device in the IP message, and re-encapsulating to obtain the encapsulated packet, wherein the first switching device is a switching device receiving the to-be-forwarded packet; the second switching device collects network information in the encapsulated packet and sends the network information to the controller; subscribing to computing power resource information of the computing power cluster and sending the computing power resource information to the controller; the first switching device, the second switching device and the core switching device construct a global network topology, wherein the global network topology includes multiple nodes; the network information plans a general routing table for each node; the network information and the computing power resource information plans a computing power routing table for each node; a request type in the packet to be forwarded matches a target routing path for the packet to be forwarded, wherein the target routing path is determined according to the general routing table or the computing power routing table.

According to a computing power routing method provided by the present invention, the request type includes a content request type; the request type in the packet to be forwarded matches a destination routing path for the packet to be forwarded, specifically including: in the case where the request type is a content request type, the general routing table matches a destination routing path for the packet to be forwarded.

According to a computing power routing method provided by the present invention, the general routing table includes multiple first target selectable paths; the general routing table matches a target routing path for the packets to be forwarded, specifically including: sorting the first target selectable paths according to the link capacity of each first target selectable path from largest to smallest, wherein the link capacity is the capacity of the smallest edge of the first target selectable path; and using the first target selectable path with the highest sort; the first target selectable path with the highest ranking is used as the destination routing path to match the packets to be forwarded.

According to a computing power routing method provided by the present invention, the network information plans a general routing table for each node, specifically including: a depth-first search algorithm and a global network topology to construct a set of selectable paths, wherein the set of selectable paths includes multiple selectable paths; the selectable paths obtain a first target selectable path; and multiple first target selectable paths obtain a general routing table.

According to a computing power routing method provided by the present invention, before the optional path gets a first target selectable path, the method further includes: determining congested nodes by network information, wherein the congested nodes are nodes whose information value corresponding to the network information exceeds a predetermined threshold; and the optional path gets a first target selectable path, specifically including: eliminating the optional path containing the congested nodes to get multiple first target selectable paths.

According to a computing power routing method provided by the present invention, the request type includes a computing power request type; the request type in the packet to be forwarded matches a destination routing path for the packet to be forwarded, specifically including: in the case where the request type is a computing power request type, the computing power routing table matches a destination routing path for the packet to be forwarded.

According to a computing power routing method provided by the present invention, the computing power routing table includes multiple second target selectable paths; the computing power routing table matches a target routing path for the packet to be forwarded, specifically including: sorting the second target selectable paths according to the average round-trip delay of each second target selectable path from smallest to largest; using the second target selectable path with the highest sorting as the target routing path for matching the packet to be forwarded path.

According to a computing power routing method provided by the present invention, network information and computing power resource information plan a computing power routing table for each node, specifically including: obtaining multiple first target selectable paths in a general routing table, wherein the general routing table is determined based on the network information; computing power resource information determines an undesired service type, wherein the undesired service type is a service type whose average service access during a predetermined period is less than the unwanted service type determines a node to be rejected corresponding to the unwanted service type; the computing power resource information determines an overload node, wherein the overload node is a node whose load value exceeds a load threshold; the first target selectable path containing the node to be rejected and the overload node is rejected to obtain multiple second target selectable paths; and multiple second target selectable paths obtains the computing power routing table.

According to a computing power routing method provided by the present invention, the second switching device collects network information in the encapsulated packets, specifically including: in the case where the first switching device is an edge switching device, the second switching device forwards the encapsulated packets to a server gateway connected to the second switching device; the server gateway parses the encapsulated packets and collects the network information in the encapsulated packets.

According to a computing power routing method provided by the present invention, the second switching device includes a second programmable switching device; the second switching device collects network information in the encapsulated packets, specifically including: in the case where the first switching device is a core switching device, the second programmable switching device parses the encapsulated packets and collects the network information in the encapsulated packets.

According to a computing power routing method provided by the present invention, computing power resource information is send to a controller, specifically including: encapsulating computing power resource information using a transport layer protocol to obtain encapsulated computing power resource information; and sending encapsulated computing power resource information to the controller.

According to a computing power routing method provided by the present invention, the computing power resource information is obtained in the following manner: a control node in a computing power cluster publishes computing power resource information of the computing power cluster to an autonomous domain gateway and a network service provider edge gateway in a computing power routing scenario.

The present invention also provides a computing power routing device for application in a computing power routing scenario, wherein the computing power routing scenario includes at least a first switching device, a second switching device, a core switching device, a controller, and a computing power cluster, and the computing power routing device includes: a first module for receiving a packet to be forwarded, wherein the packet to be forwarded includes an IP message, and the IP message includes at least a destination address; a second module for inserting network information of the first switching device in the IP packet and re-encapsulate the packet to be forwarded to obtain the encapsulated packet, wherein the first switching device is the switching device receiving the packet to be forwarded; the third module is used for the second switching device to collect the network information in the encapsulated packet and send the network information to the controller; the fourth module is used to subscribe to the computing power resource information of the computing power cluster and send the computing power resource information to the controller; the fifth module is used for the first switching device, the second switching device and the core switching device to construct a global network topology, wherein the global network topology includes multiple nodes; the sixth module is used for the network information to plan a general routing table for each node; the seventh module is used for the network information and the computing power resource information to plan a computing power routing table for each node; the eighth module is used for the request type in the packet to be forwarded, and for the request type in the packet to be forwarded, matching the target routing path for the packet to be forwarded, wherein the target routing path is determined according to the general routing table or the computing power routing table.

The invention also provides an electronic device comprising a memory, a processor and a computer program stored in the memory and runnable on the processor, the processor executes the program to implement a computing power routing method such as any of the above.

The present invention also provides a non-transitory computer readable storage medium having a computer program stored thereon, the computer program implements a computing power routing method such as any of the above when executed by a processor.

The present invention also provides a computer program product comprising a computer program, the computer program when executed by a processor implements a computing power routing method as described above in any of the above.

The present invention provides computing power routing method, device, electronic device and storage medium, by obtaining network information of the first switching device and computing power resource information of the computing power cluster, and network information to plan a general routing table for each routing node, network information and computing power resource information plan a computing power routing table for each routing node; and then a request type in the packet to be forwarded matches the target routing path for the packet to be forwarded wherein the destination routing path is determined according to the general routing table or the computing power routing table. In the present invention, the target routing path is delivered to the packets to be forwarded, which can ensure the collaborative scheduling of the computing power resources within the network without affecting the content service.

BRIEF DESCRIPTION OF DRAWINGS

In order to more clearly illustrate the invention or the technical solutions in the prior art, the following is a brief description of the drawings required to be used in the description of the embodiments or prior art, and it will be apparent that the drawings in the following description are some embodiments of the invention, and that other drawings may be obtained on the basis of these drawings without any creative effort on the part of a person of ordinary skill in the art.

DETAILED DESCRIPTION OF EMBODIMENTS

Figure 1:
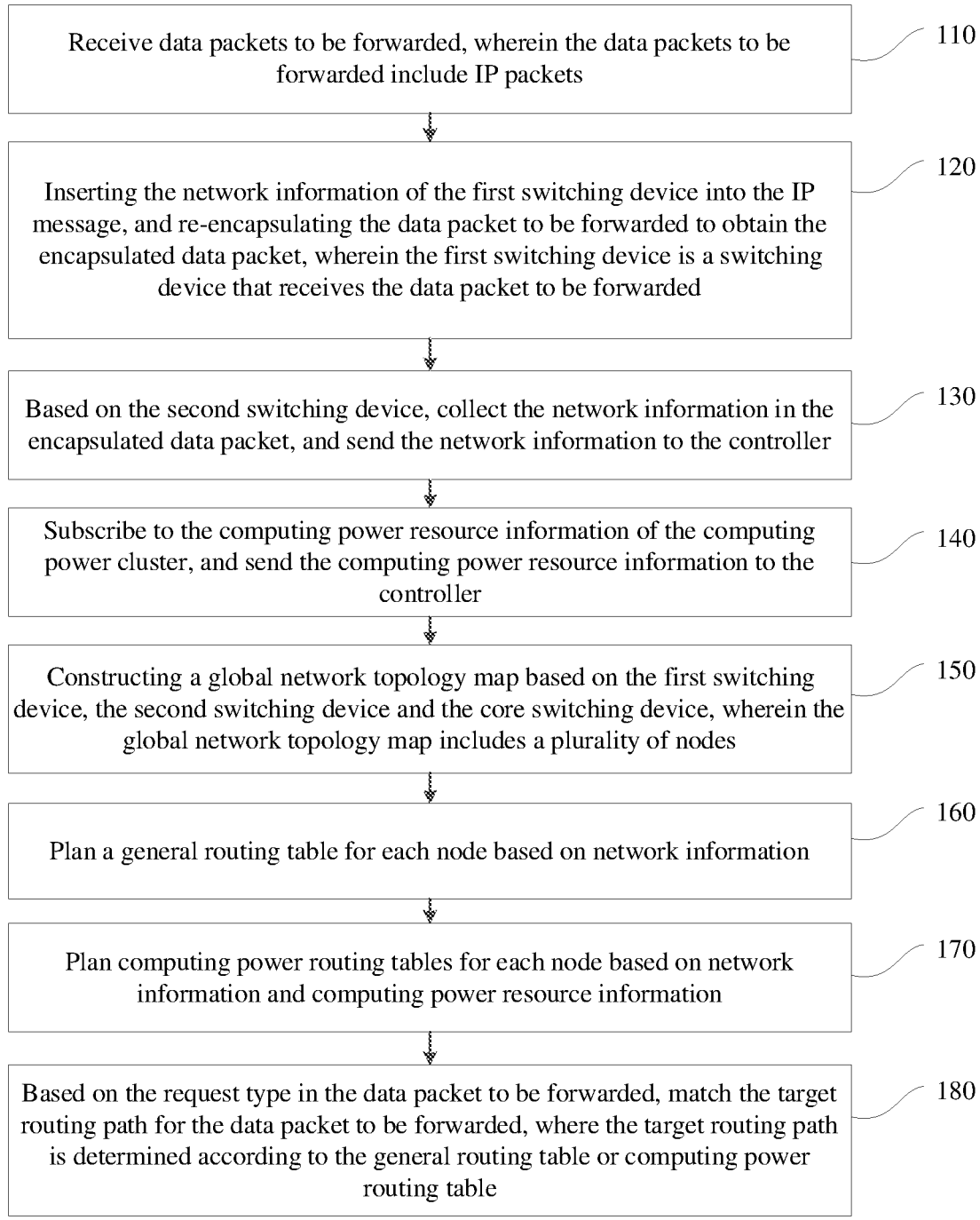
FIG. 1 is a schematic flow diagram of the computing power routing method provided by the present invention.

In order to make the purpose, technical solutions and advantages of the present invention clearer, the technical solutions in the present invention will be described clearly and completely below in conjunction with the accompanying drawings in the present invention, and it is clear that the described embodiments are a part of the embodiments of the present invention, and not all of them. The embodiments in the present invention, all other embodiments obtained by a person of ordinary skill in the art without making creative labor, fall within the scope of protection of the present invention.

The computing power routing method provided by the present invention can be divided into three dimensions for deployment implementation in the data plane, control side, and user side. Among them, in the data plane, network information such as delay, packet queue length, congestion status, packet loss rate, etc. within the network can be obtained through the programmable switching device, and computing power resource information such as computing power power distribution, service load, service type and device type within/between network autonomous domains can be obtained through the intra/inter-domain network devices as well as the controller; in the control plane, the controller of each network device to collect the computing power resource information and network information for each routing node to plan the general routing table and computing power routing table, the two routing tables are filtered and sent to the data plane of the switching equipment. In the user side, the edge network devices select the computing power routing table or the general routing table for routing according to the user's request type, and match the target routing path for the packets to be forwarded. The present invention can efficiently route different types of user requests and maximize the utilization of computing power resources and network resources while satisfying the quality of service (QoS) of users.

It is understood that the data plane is usually a device that implements data forwarding with hardware switches, hardware routers, or software switches, etc., and in the present invention is mainly implemented by devices such as switches, routers, and software/hardware gateways. The control plane usually refers to the software devices that realize routing and path planning, and in the present invention is mainly realized by high-performance servers and controller software running on the servers. The user side mainly refers to user terminals, edge gateways that process user requests, and switching devices, etc. In the present invention, it is mainly realized by devices such as desktop hosts, servers, and software switches.

To further describe the computing power routing method provided by the present invention, the following will be described in conjunction with the following embodiments.

In an exemplary embodiment of the present invention, the computing power routing method may be applied to a computing power routing scenario, wherein the computing power routing scenario may include at least a first switching device, a second switching device, a core switching device, a controller, and a computing power cluster.

Figures 2, 3:
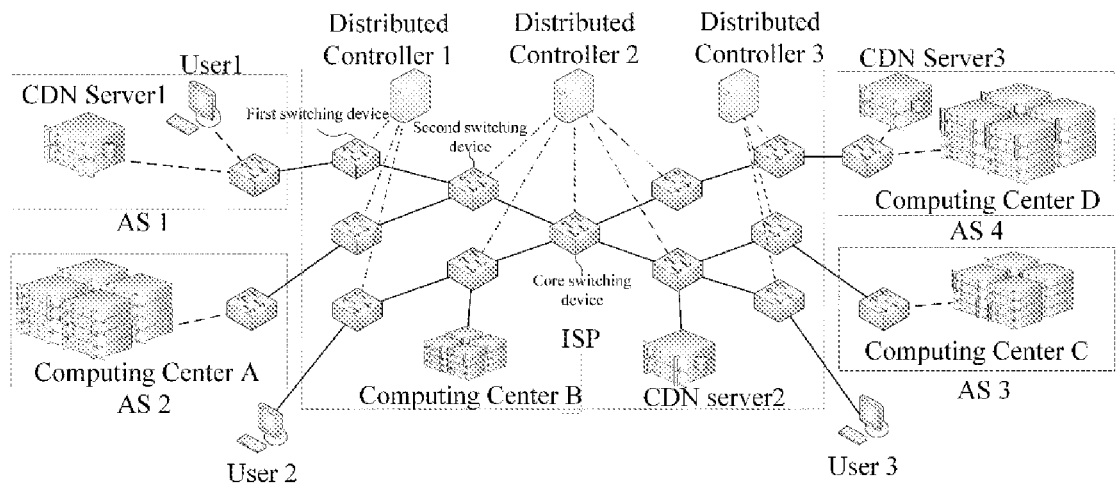
FIG. 2 is a schematic diagram of the computing power routing scenario provided by the present invention.
FIG. 3 is a schematic diagram of the flow of the general routing table provided by the present invention for matching destination routing paths for packets to be forwarded.

FIG. 2 is a schematic diagram of the computing power routing scenario provided by the present invention, and in combination with FIG. 2, it can be seen that the main networks/domains in the computing power routing scenario can be classified as users (including user 1, user 2 and user 3), Internet Service Provider (ISP) that provides network access and forwarding services, and autonomous domains AS (including autonomous domain 1, autonomous domain 2, autonomous domain 3 and autonomous domain 4) that are independent from ISP and are operated and maintained by the organization and Autonomous Domain AS (including Autonomous Domain 1, Autonomous Domain 2, Autonomous Domain 3 and Autonomous Domain 4), which is independent from ISP and is operated and maintained by the organization and provides computing power services and content distribution CDN services to users. Among them, each autonomous domain can have a computing power center and CDN servers deployed. Take Autonomous Domain 4 as an example, it can deploy computing power Center D and CDN server 3.

It is to be noted that in the ISP, there may be deployed a computing power center B and a CDN server 2 and a switching device, wherein the switching device may include a core switching device, a first switching device, and a second switching device, wherein the respective switching device may be connected by communication. Each switching device may also be communicatively connected to a distributed controller (including distributed controller 1, distributed controller 2, and distributed controller 3) on the control side.

It should be noted that the distributed controller can be understood as the controller above, and each computing power center (including computing power center A, computing power center B, computing power center C and computing power center D) can be understood as a computing power cluster.

FIG. 1 is a flow diagram of the computing power routing method provided by the present invention.

As can be seen in conjunction with FIG. 1, the computing power routing method may include steps 110 to 180, each of which will be described below.

In step 110, the to-be-forwarded packet is received, wherein the to-be-forwarded packet comprises an IP message.

In step 120, the network information of the first switching device is inserted in the IP message and the packet to be forwarded is re-encapsulated to obtain the encapsulated packet, wherein the first switching device is the switching device receiving the packet to be forwarded.

In one embodiment, the packets to be forwarded can be understood as packets to be delivered, and in the present invention, by matching the target routing path for the packets to be forwarded, it is possible to ensure the collaborative scheduling of computing power resources within the network without the content service being affected.

In one embodiment, in the insert data phase, the programmable switching device of the data plane (e.g., the first switching device), after receiving the packet (corresponding to the packet to be forwarded), may perform a parsing operation on the packet, and after the hash check algorithm verifies the integrity of the packet, the switch obtains the contents of each field of the packet. Further, the switch inserts the network information of the current switching device in the IP message of the packet. Then the packet is re-encapsulated to get the encapsulated packet and forwarded to the port matching the destination IP address.

Among other things, the network information may include one or more of identifier, receive time, send time, number of messages, average queue length, cache occupancy, packet loss statistics, port forwarding rate, and port utilization. The designated port that the switch ultimately forwards can be determined based on the source address and destination address fields in the packet content and the routing table entries matched to the resource limit field.

In yet another embodiment, continuing with the previous embodiment, when the hash check integrity fails, it indicates that an error code occurred during packet transmission, at which point the switch drops the packet.

In yet another embodiment, to reduce the additional bandwidth overhead caused by inserting network information into packets, the switching device will extract packets at a predetermined sampling rate and then insert network information.

In step 130, the second switching device collects the network information in the encapsulated packets and sends the network information to the controller.

It should be noted that the second switching device can be understood as a switching device that collects network information in the encapsulated packets.

In an exemplary embodiment of the present invention, the second switching device collects the network information in the encapsulated packets and sends the network information to the controller, which may be implemented in the following manner:

in the case where the first switching device is an edge switching device, the second switching device forwards the encapsulated packets to a server gateway connected to the second switching device;

the server gateway parses the encapsulated packets and collects the network information in the encapsulated packets.

In one embodiment, for the data collection phase, it can be reasonably selected based on the network location and traffic load. For a general node near the edge of the network (corresponding to the first switching device as an edge switching device), its traffic load is relatively low and can be forwarded to the server gateway (corresponding to the server gateway connected to the second switching device) after the encapsulated packets reach the second switching device. Among other things, a kernel-state daemon running on the gateway keeps a watchful eye on the packets coming from a specific port. When the encapsulated packet arrives, the daemon copies the encapsulated packet to the user state, where the user state program parses the encapsulated packet and collects the network information in the encapsulated packet. Collecting network information in this way maximizes the utilization of hardware resources.

In a further exemplary embodiment of the present invention, the second switching device may comprise a second programmable switching device, wherein the second programmable switching device may be understood to be a programmable second switching device.

The collection of network information in encapsulated packets by the second switching device can be achieved in the following ways:

in the case where the first switching device is the core switching device, the second programmable switching device parses the encapsulated packets and collects the network information in the encapsulated packets.

In one embodiment, for the core switching node, its traffic load is large and requires high performance forwarding hardware to meet the performance requirements. In the application, when the encapsulated packet arrives at the programmable switch (corresponding to the second programmable switching device), the switch performs a parsing operation on the encapsulated packet and obtains the contents of each field of the packet after hash-checking to verify the integrity of the packet. The switch then strips the fields inserted into the network information content and re-encapsulates these fields and sends them to the controller.

In yet another embodiment, the switching device (corresponding to the second programmable switching device) may use the RPC protocol as the underlying encapsulation of the network information when forwarding it to the control plane.

It should be noted that on the controller side, the controller can put the collected information (including network information and computing power resource information) into a distributed database, which is jointly maintained by multiple distributed controllers (corresponding to distributed controller 1 to distributed controller 3 in FIG. 2) and ensures data consistency.

In step 140, the computing power resource information of the computing power cluster is subscribed and the computing power resource information is sent to the controller.

In a further exemplary embodiment of the present invention, information on computing power resources may be obtained in the following manner:

the control node in the computing power cluster issues information about the computing power resources of the computing power cluster to the autonomous domain gateways and network service provider edge gateways in the computing power routing scenario.

In one embodiment, the control node of the computing power cluster may periodically publish or update the computing power resource information of the computing power cluster to the AS gateway/ISP edge gateway periodically. In one embodiment, the user-state process running at the AS gateway/ISP edge gateway subscribes to the computing power resource information, then encapsulates and encrypts the received computing power resource information, and forwards the message of the computing power resource information to the controller.

In one embodiment, the computing power resource information may include cluster load, resource distribution, service type, computing power hardware type, cluster/current node available bandwidth, etc. The frequency of updating the computing power resource information may be set by the computing power cluster internally or by the autonomous domain.

In an exemplary embodiment of the present invention, sending the computing power resource information to the controller may be achieved by:

encapsulating computing power resource information using transport layer protocols to obtain encapsulated computing power resource information;

sending the encapsulated computing power resource information to the controller.

It should be noted that the transport layer protocol can be adapted to the actual situation, for example, it can be the QUIC protocol, and in this embodiment no specific limitation is made on the transport layer protocol.

In an embodiment, to ensure that the computing power resource information messages can be delivered to the controller in a rapid, orderly and reliable manner, the present invention can use the transport layer QUIC protocol as its underlying encapsulation. Encryption algorithm can also be used to ensure its reliability and security.

In the data collection phase, the listener process maintained by the controller can parse and store the message in the distributed database after receiving the message with information about computing power resources.

In step 150, the first switching device, the second switching device, and the core switching device construct a global network topology, wherein the global network topology includes multiple nodes.

In step 160, the network information plans a general routing table for each node.

In step 170, the network information and the computing power resource information plan the computing power routing table for each node.

In one embodiment, a global network topology may be constructed by the first switching device, the second switching device, and the core switching device, wherein multiple nodes of the global network topology may be understood to be nodes comprising switching devices.

Further, the controller can obtain network information and computing power resource information through the distributed database. In the application process, after the connection between the switching device and the controller is established, the controller assigns a global unique ID to the switching device to complete device registration. The controllers share the information of the switching devices through the distributed database and obtain the global network topology. Then the controller network information plans the general routing table for each node, and the network information is combined with the computing power resource information to plan the computing power routing table for each node.

In step 180, the request type in the to-be-forwarded packet matches a destination routing path for the to-be-forwarded packet, wherein the destination routing path is determined based on a general routing table or a computing power routing table.

In one embodiment, the application layer program implements the function of marking user requests (corresponding to the requests in the packets to be forwarded). In one embodiment, the edge gateway parses the user request token to obtain the request type in the packet to be forwarded. The request type in the packet to be forwarded then matches the target routing path for the packet to be forwarded, thereby enabling sorted routing of requests.

In one embodiment, when a user sends a computing power request through the application layer service, the application layer service program can encapsulate the request type tag by adding it to an optional field in the IP message header and forward the user request to the local edge gateway. The switching device of the edge gateway parses the request type tag bit in the request message sent by the user and analyzes its request type.

In an exemplary embodiment of the present invention, the request type may include a content request type;

the request type in the to-be-forwarded packet matches the destination routing path for the to-be-forwarded packet can be implemented in the following way:
in the case where the request type is a content request type, the general routing table matches the destination routing path for the packet to be forwarded.

Continuing with the previous implementation as an example, when the computing power request flag bit is 0, the user request is a content request type and the switching device can select a general routing table for matching.

In a further exemplary embodiment of the present invention, the request type may further comprise a computing power request type;

the request type in the to-be-forwarded packet matches the destination routing path for the to-be-forwarded packet can be implemented in the following way:
in case the request type is computing power request type, the computing power routing table matches the destination routing path for the packet to be forwarded.

Continuing with the previous implementation as an example, when the computing power request flag bit is 1, the user request is of the computing power request type and the switching device can select the computing power routing table for matching.

It should be noted that during the application, the matching operation will elect the forwarding port with the longest prefix matching rule. The parsing, matching, and de-parsing behavior of the switching device can be implemented by writing P4 programs.

The present invention provides a computing power routing method, by obtaining network information of the first switching device and computing power resource information of the computing power cluster, and network information to plan a general routing table for each routing node, and network information and computing power resource information to plan a computing power routing table for each routing node; and then a request type in the packet to be forwarded matches a target routing path for the packet to be forwarded, wherein the target routing path is determined according to general routing table or computing power routing table. In the present invention, the target routing path is delivered to the packets to be forwarded, which can ensure the cooperative scheduling of the computing power resources within the network without affecting the content service.

FIG. 3 is a schematic diagram of the flow of the general routing table provided by the present invention to match the destination routing path for the packets to be forwarded.

To further describe the general routing table for matching destination routing paths for packets to be forwarded, the following is illustrated in conjunction with the following implementation.

In yet another exemplary embodiment of the present invention, the general routing table may include multiple first destination selectable paths. As can be seen in conjunction with FIG. 3, the general routing table matching a destination routing path for the packets to be forwarded may include steps 310 and 320, each of which will be described below.

In step 310, the first target selectable paths are sorted according to the link capacity of each first target selectable path from largest to smallest, wherein the link capacity is the capacity of the smallest edge in the first target selectable path.

In step 320, the first destination optional path with the highest ranking is used as the destination routing path for matching the packets to be forwarded.

In one embodiment, multiple first target selectable paths in the general routing table may be sorted to obtain a sorted table sorted according to the link tolerance of the first target selectable path from largest to smallest. Further, the first target selectable path located first in the sorted table may be used as a destination routing path for matching packets to be forwarded.

It is to be noted that the link tolerance may be determined based on the capacity of the smallest one of the edges in the first target selectable path. With this embodiment, suitable destination routing paths can be matched for the packets to be forwarded, thereby ensuring that the destination routing paths can ensure cooperative scheduling of computing power resources within the network when delivering the packets to be forwarded, provided that the content service is not affected.

Figure 4:
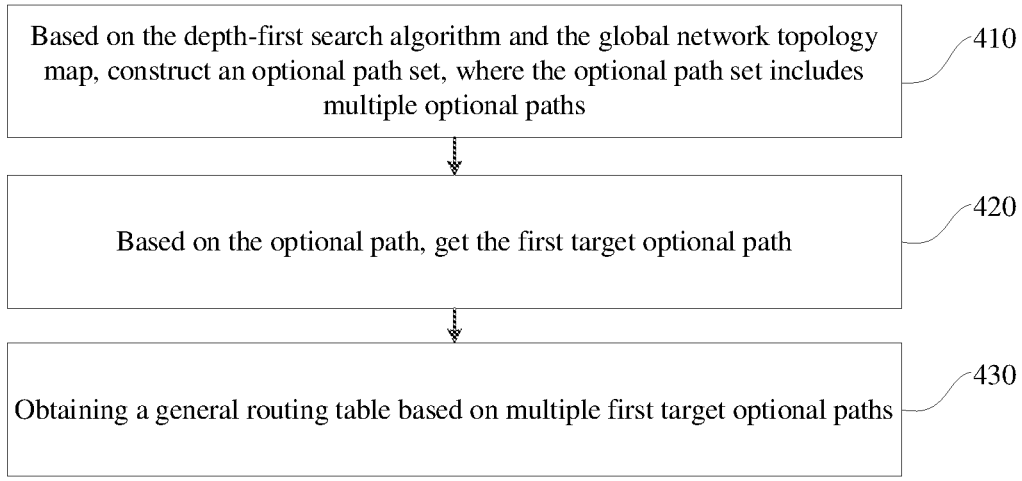
FIG. 4 is one of the schematic diagrams of the process of planning a general routing table for individual nodes with the network information provided by the present invention.

FIG. 4 is one of the schematic diagrams of the process of planning a general routing table for each node with the network information provided by the present invention.

In an exemplary embodiment of the present invention, as can be seen in conjunction with FIG. 4, the network information to plan a general routing table for each node may include steps 410 to 430, each of which is described below.

In step 410, a depth-first search algorithm and a global network topology are used to construct a set of selectable paths, wherein the set of selectable paths includes multiple selectable paths.

In one embodiment, in order to avoid routing loops, a recursive method may be used to calculate the set of optional paths. When planning a general routing path, an optional node set V is first constructed based on the global network topology, where $V=\{v_1, v_2, v_3, \ldots, v_k\}$, $v_1, v_2, v_3, \ldots, v_k$ represents an optional node. The current node is denoted as $s_i$, $s_i \in V$. The combination of neighbor nodes of $s_i$ is recorded as N. Among them, $N=\{n_1, n_2, n_3, \ldots, n_k\}$. The destination node is recorded as $d_j$, $d_j \in V \wedge d_j \neq s_i$. The set of reached nodes is recorded as A, $A=\{a_1, a_2, a_3, \ldots, a_k\}$. The depth-first search algorithm is used to find the optional path set P from $s_i$ to $d_j$, $=\{p_1, p_2, p_3, \ldots, p_k | p_i = v_{i_0} v_{i_1} \ldots v_{i_n}\}$.

For a certain node $s_i$ in the recursive process, the neighbor node $n_l$ of $s_i$ is selected. And whether $n_l$ is the destination node $d_j$ is judged.

If $n_l = d_j$, it means that an alternative path $p_i = v_{i_0} v_{i_1} \ldots s_{i-1} s_i n_l$ has been found. $p_i$ is stored in the set of optional paths P. $n_l$ is put into the set A of reached nodes. The recursive process returns to the previous node $s_{i-1}$ of $s_i$. $p_{i-1} = v_{i_0} v_{i_1} \ldots s_{i-1}$ is taken as the current path and continued to search for the next optional path with $A = A \cup n_l$.

If $n_l \neq d_j$, whether $n_l$ is in the reached node set A is judged. If $n_l \in A$, then the next neighbor node $n_{l+1}$ of $s_i$ is selected as the current node for depth-first search; if $n_l \notin A$, then $n_l$ is put into the reached node set, that is, $A = A \cup n_l$, and then a depth-first search with $n_l$ is performed as the current node.

Repeat the above process until all nodes have been reached, that is, $V=A$. In this way, the optional path set P is obtained. In the application process, based on the obtained optional path set P, the controller screens according to network information and computing power information, and can obtain routing paths that meet different business requirements. The process of obtaining the first target optional path based on the optional path will be introduced below in conjunction with the following embodiments.

In step 420, the selectable path is obtained as the first target selectable path.

In step 430, multiple first target selectable paths are obtained from the general routing table.

In one embodiment, a first target selectable path can be obtained based on the obtained optional path, and then a general routing table can be obtained by combining multiple first target selectable paths.

Figure 5:
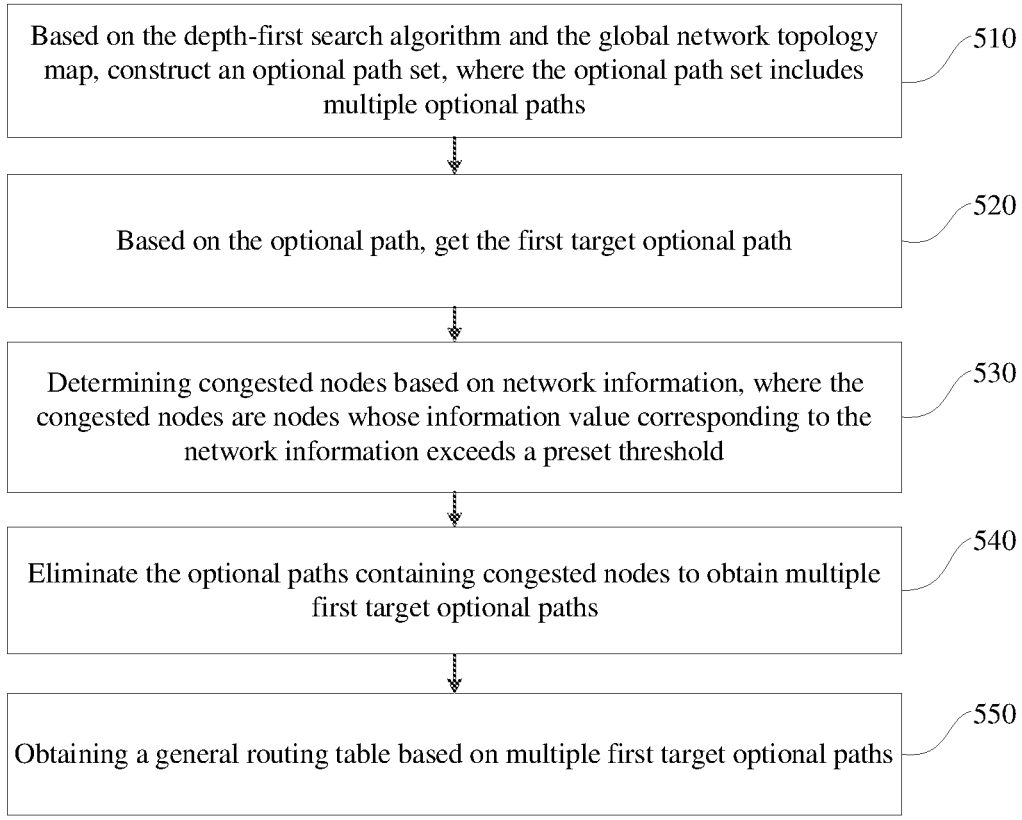
FIG. 5 is a schematic diagram of the process of planning a general routing table for each node with the network information provided by the present invention.

FIG. 5 is a schematic diagram of the process of planning a general routing table for each node with the network information provided by the present invention.

To further describe the computing power routing method provided by the present invention, an alternative process of planning a general routing table for individual nodes with network information is described below in conjunction with FIG. 5.

In an exemplary embodiment of the present invention, in conjunction with FIG. 5, it can be seen that the network information to plan a general routing table for each node can include steps 510 to 550, where steps 510 to 520 are the same as steps 410 to 420 and steps 550 to 450, the specific implementation and beneficial effects of which are described in the previous section and will not be repeated in this embodiment, and steps 530 and 540 are described separately below.

In step 530, the network information determines a congestion node, wherein the congestion node is a node for which the information value corresponding to the network information exceeds a predetermined threshold.

In step 540, the optional paths containing congested nodes are eliminated to obtain multiple first target optional paths.

In one embodiment, the fine-grained network information obtained by the control can be analyzed to determine the switching nodes that may have congestion. Further, the optional paths containing congested nodes are eliminated to obtain multiple first target optional paths.

Among them, a switching node whose difference between outgoing time and receiving time or average queue length or port utilization or packet loss rate is greater than a certain corresponding threshold can be referred to as a congested node.

Figure 6:
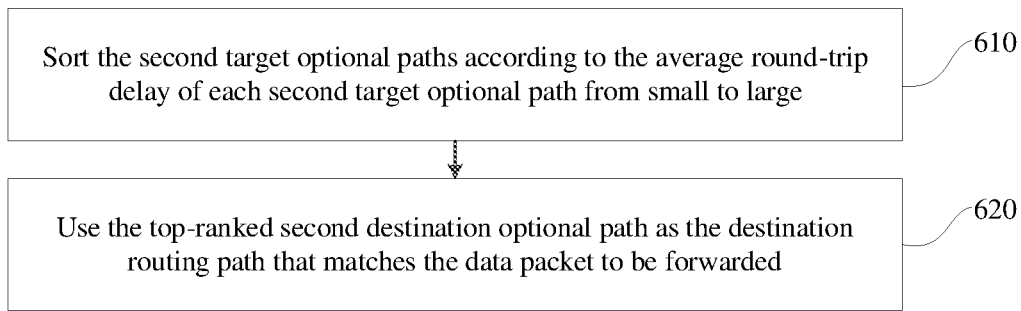
FIG. 6 is a schematic diagram of the flow of the computing power routing table provided by the present invention for matching destination routing paths for packets to be forwarded.

FIG. 6 is a schematic diagram of the flow of the computing power routing table provided by the present invention to match the destination routing path for the packets to be forwarded.

The process of computing power routing table to match destination routing paths for packets to be forwarded is explained below in conjunction with FIG. 6.

In an exemplary embodiment of the present invention, the computing power routing table may include multiple second target selectable paths. As can be seen in conjunction with FIG. 6, the computing power routing table matches target routing paths for packets to be forwarded may include steps 610 and 620, each of which will be described below.

In step 610, the second target selectable paths are sorted according to the average round-trip delay of each second target selectable path from smallest to largest.

In step 620, the second destination optional path, which is the most highly ranked, is used as the destination routing path to match the packets to be forwarded.

In one embodiment, multiple second target selectable paths in the computing power routing table may be sorted to obtain a sorted table sorted from smallest to largest according to the average round-trip delay of the second target selectable paths. Further, the second target selectable path located first in the sorted table may be used as the target routing path for matching the packets to be forwarded. With this embodiment, a suitable target routing path can be matched for the packets to be forwarded, thereby ensuring that the target routing path can ensure cooperative scheduling of computing power resources within the network when the packets to be forwarded are delivered without the content service being affected.

Figure 7:
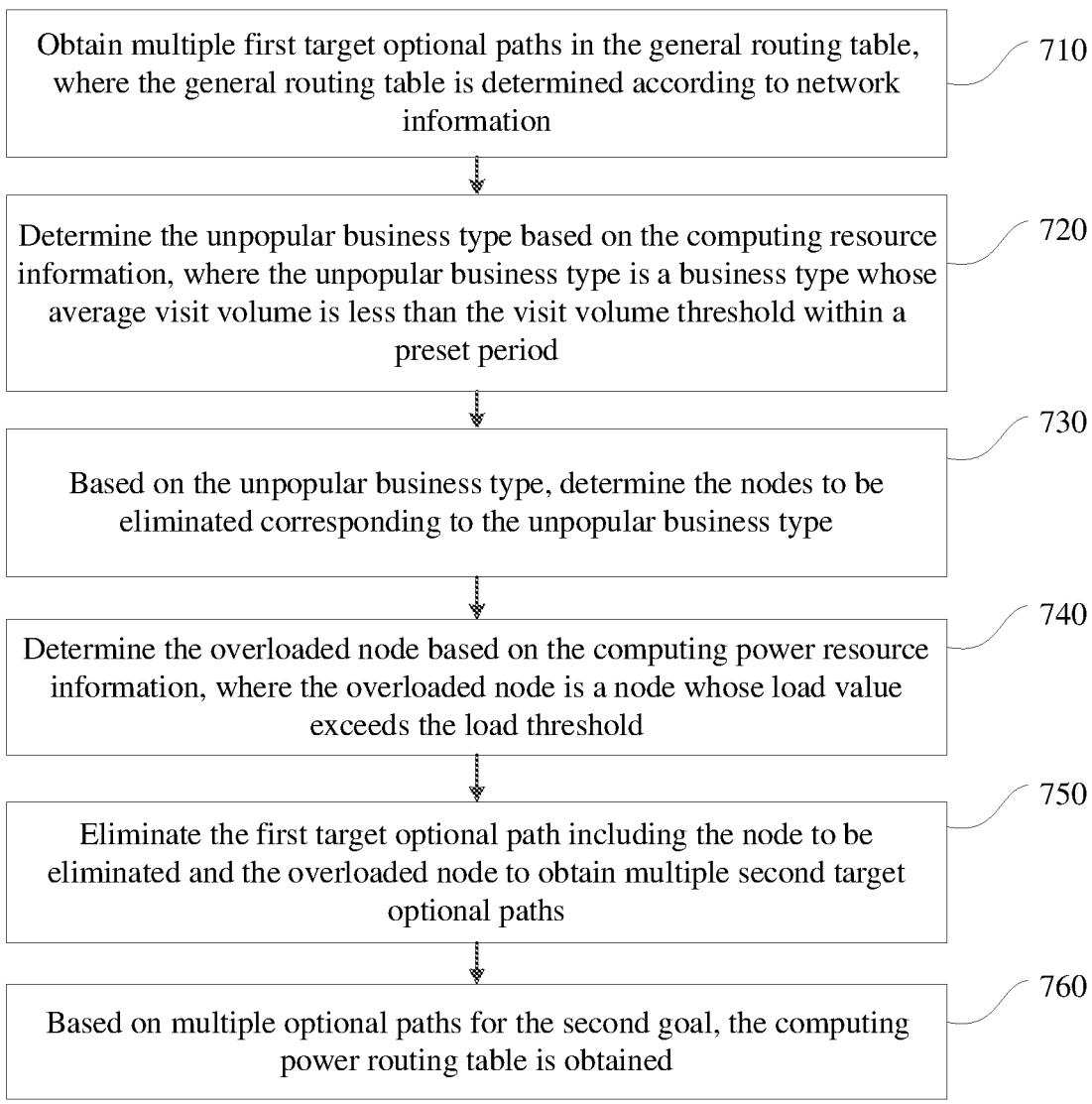
FIG. 7 is a schematic diagram of the process of planning a computing power routing table for each node with the network information and computing power resource information provided by the present invention.

FIG. 7 is a schematic diagram of the process of planning the computing power routing table for each node with the network information and computing power resource information provided by the present invention.

The process of planning the computing power routing table for each node with the network information and computing power resource information will be explained in the following FIG. 7.

In an exemplary embodiment of the present invention, as can be seen in conjunction with FIG. 7, the network information and computing power resource information to plan a computing power routing table for each node may include steps 710 to 760, each of which will be described below.

In step 710, multiple first target selectable paths in a general routing table are obtained, wherein the general routing table is determined based on network information.

In step 720, the computing power resource information determines an undesired business type, wherein the undesired business type is a business type whose average number of business visits is less than an access threshold during a predetermined period.

In step 730, the undesired business type determines the node to be eliminated corresponding to the undesired business type.

In step 740, the computing power resource information determines an overload node, wherein the overload node is a node whose load value exceeds a load threshold.

In one embodiment, the node set of the computing power cluster can be defined as S, $CS=\{cs_1, cs_2, cs_3, \ldots, cs_k\}$; Filter by business type, the business type set is defined as BS, $BS=\{bs_1, bs_2, bs_3, \ldots, bs_k\}$. Further, based on the average visits of services within the statistical period, the BS s can be sorted from the largest to the smallest average visits, and unpopular business types can be screened out. Furthermore, nodes to be eliminated corresponding to unpopular business types can be screened out from the CS.

In yet another embodiment, the computing power resource information can also be filtered by cluster load to determine overloaded nodes.

In step 750, the first target selectable path containing the nodes to be eliminated and the overloaded nodes is eliminated to obtain multiple second target selectable paths.

In step 760, multiple second target selectable paths are obtained from the computing power routing table.

In one embodiment, the first target selectable path containing the nodes to be eliminated and the overloaded nodes can be eliminated to obtain multiple second target selectable paths. Further, multiple second target selectable paths are then available to obtain a computing power routing table.

It should be noted that the abstraction and complexity of the network have always been the biggest obstacle to the full utilization of network resources. The computing power routing method provided by the present invention, by collecting network information and computing power resource information in the data plane, takes the means of fine-grained planning for content services that are affected by network fluctuations and routings the requests to the nearest CDN node. For computing power services affected by network fluctuations and computing power resources, a comprehensive planning means is adopted to routing requests to the nearest computing power node that can meet the service demand, thereby significantly reducing user request latency, reducing service processing overhead and improving the utilization of network resources and computing power resources. The proposed routing technology is compatible with existing routing mechanisms, and as the underlying support technology for the future computing power network architecture, the data surface programmable technology mainly used in the present invention has good portability and expandability.

According to the above description, it can be seen that the present invention provides a computing power routing method, by obtaining network information of the first switching device and computing power resource information of the computing power cluster, and network information to plan a general routing table for each routing node, and network information and computing power resource information to plan a computing power routing table for each routing node; then a request type in the packet to be forwarded matches a target routing path for the packet to be forwarded, wherein the target routing path is determined according to the general routing table or the computing power routing table. In the present invention, the target routing path is delivered for the packets to be forwarded, which can ensure the collaborative scheduling of computing power resources within the network without affecting the content service.

The same idea, the invention also provides a computing power routing device.

The computing power routing apparatus provided by the present invention is described below, and the computing power routing apparatus described below and the computing power routing method described above may be cross-referenced.

Figure 8:
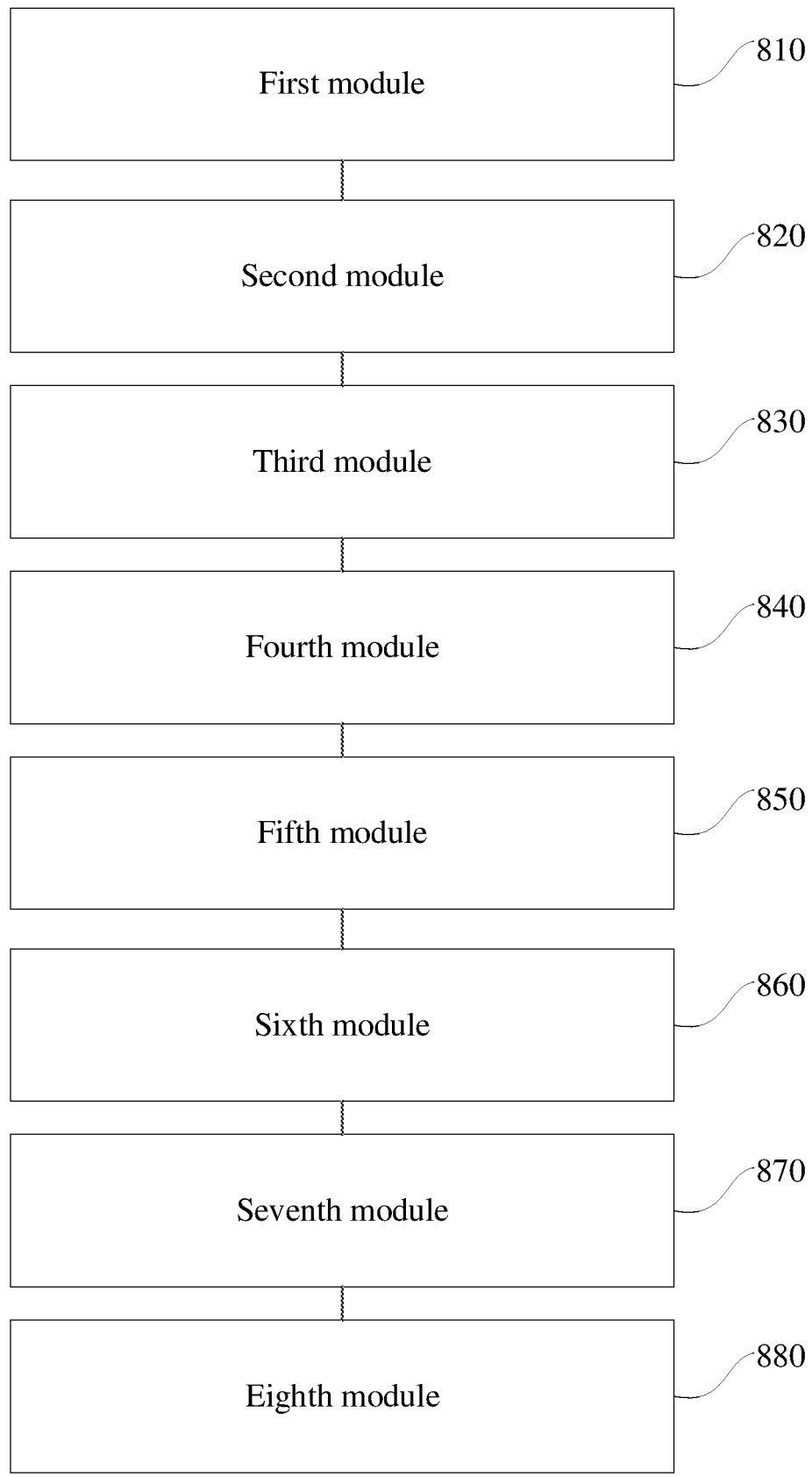
FIG. 8 is a schematic diagram of the structure of the computing power routing device provided by the present invention.

FIG. 8 is a schematic diagram of the structure of the computing power routing device provided by the present invention.

In an exemplary embodiment of the present invention, the computing power routing device may be applied in a computing power routing scenario, wherein the computing power routing scenario may include at least a first switching device, a second switching device, a core switching device, a controller, and a computing power cluster. As can be seen in conjunction with FIG. 8, the computing power routing device may include first module 810 to eighth module 880, each of which will be described below.

The first module 810 may be configured for receiving packets to be forwarded, wherein the packets to be forwarded may include IP packets;

the second module 820 may be configured for inserting network information of the first switching device in the IP message and re-encapsulating the packet to be forwarded to obtain the encapsulated packet, wherein the first switching device is a switching device that receives the packet to be forwarded;

the third module 830 may be configured for the second switching device to collect network information in the encapsulated packets and send the network information to the controller;

the fourth module 840 may be configured for subscribing to the computing power resource information of the computing power cluster and sending the computing power resource information to the controller;

the fifth module 850 may be configured for the first switching device, the second switching device, and the core switching device to construct a global network topology, wherein the global network topology includes multiple nodes;

the sixth module 860 may be configured to be used for network information to plan general routing tables for individual nodes;

the seventh module 870 may be configured to use network information and computing power resource information to pla computing power routing tables for individual nodes;

the eighth module 880 may be configured to match a destination routing path for the packet to be forwarded for the request type in the packet to be forwarded, wherein the destination routing path is determined based on a general routing table or a computing power routing table.

In an exemplary embodiment of the present invention, the request type may include a content request type; the eighth module 880 may match a destination routing path for the packet to be forwarded using the request type in the packet to be forwarded in the following manner:
  in the case where the request type is a content request type, the general routing table matches the destination routing path for the packet to be forwarded.

In an exemplary embodiment of the present invention, the general routing table may include multiple first destination selectable paths; the eighth module 880 may use the general routing table to match destination routing paths for packets to be forwarded in the following manner:
  ranking the first target selectable paths according to the link capacity of each first target selectable path from largest to smallest, wherein the link capacity is the capacity of the smallest edge in the first target selectable path;
  the first destination optional path with the highest ranking is used as the destination routing path to match the packet to be forwarded.

In an exemplary embodiment of the present invention, the sixth module 860 may plan a general routing table for each node using the following way network information:
  a depth-first search algorithm and a global network topology to construct a set of optional paths, wherein the set of optional paths includes multiple optional paths;
  optional paths to obtain the first target optional path;
  multiple first target optional paths to get a general routing table.

In an exemplary embodiment of the present invention, the sixth module 860 may further be configured for:
  the network information determines a congestion node, wherein the congestion node is a node for which the information value corresponding to the network information exceeds a predetermined threshold;
  the sixth module 860 can obtain the first target selectable path using the following optional paths:
  the optional paths that contain congested nodes are eliminated to obtain multiple first target optional paths.

In an exemplary embodiment of the present invention, the request type may include a computing power request type; the eighth module 880 may match a destination routing path for the packet to be forwarded using the request type in the packet to be forwarded in the following manner:
  in case the request type is computing power Request Type, the computing power routing table matches the destination routing path for the packet to be forwarded.

In an exemplary embodiment of the present invention, the computing power routing table may include multiple second target selectable paths;
  the eighth module 880 can match the destination routing path for the packets to be forwarded using the computing power routing table in the following way:
  ranking the second target selectable paths in order of the average round-trip delay of each second target selectable path from smallest to largest;
  the second destination optional path with the highest ranking is used as the destination routing path to match the packets to be forwarded.

In an exemplary embodiment of the present invention, the seventh module 870 may plan computing power routing tables for individual nodes using network information and computing power resource information in the following manner:
  obtaining multiple first destination selectable paths in a general routing table, wherein the general routing table is determined based on network information;
  the information on the computing power resources determines the undesired business type, where the undesired business type is the business type whose average number of business visits is less than the access threshold during the preset period;
  unwanted business types identify the nodes to be excluded corresponding to the unwanted business types;
  the computing power resource information determines the overload node, wherein the overload node is a node whose load value exceeds a load threshold;
  eliminating the first target selectable path containing the nodes to be eliminated and the overloaded nodes to obtain multiple second target selectable paths;
  multiple second target optional paths are obtained from the computing power routing table.

In an exemplary embodiment of the present invention, the third module 830 may collect the network information in the encapsulated packet using the second switching device in the following manner:
  in the case where the first switching device is an edge switching device, the second switching device forwards the encapsulated packets to a server gateway connected to the second switching device;
  the server gateway parses the encapsulated packets and collects the network information in the encapsulated packets.

In an exemplary embodiment of the present invention, the second switching device may include a second programmable switching device; the third module 830 may employ the second switching device to collect network information in the encapsulated packets in the following manner:
  in the case where the first switching device is the core switching device, the second programmable switching device parses the encapsulated packets and collects the network information in the encapsulated packets.

In an exemplary embodiment of the present invention, the third module 830 may send the computing power resource information to the controller in the following manner:
  encapsulating computing power resource information using transport layer protocols to obtain encapsulated computing power resource information;
  sending the encapsulated computing power resource information to the controller.

In an exemplary embodiment of the present invention, the third module 830 may obtain computing power resource information in the following manner:
  the control node in the computing power cluster publishes information about the computing power resources of the computing power cluster to the autonomous domain gateway and the network service provider edge gateway in the computing power routing scenario.

Figure 9:
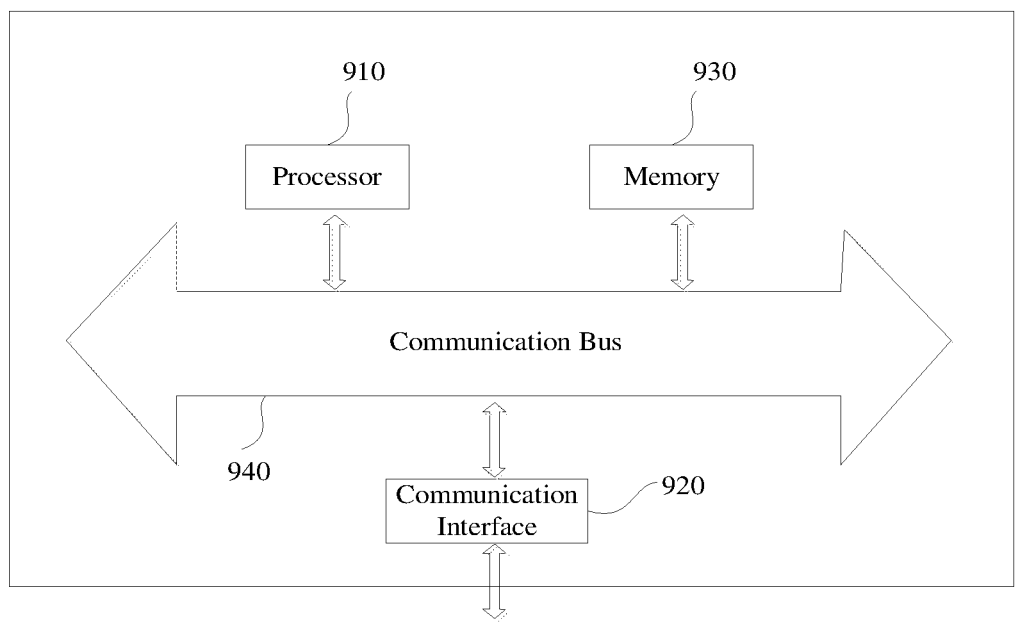
FIG. 9 is a schematic diagram of the structure of the electronic device provided by the present invention.

FIG. 9 exemplifies a schematic diagram of a physical structure of an electronic device, which may include, as shown in FIG. 9: a processor (processor) 910, a communications interface (communications interface) 920, a memory (memory) 930, and a communications bus 940, wherein the processor 910, the communications interface 920, the memory 930 complete communication with each other through the communication bus 940. The processor 910 may invoke logical instructions in the memory 930 to perform a computing power routing method, which is applied to a computing power routing scenario, wherein the computing power routing scenario includes at least a first switching device, a second switching device, a core switching device, a controller, and a computing power cluster, the computing power routing method includes: receiving a packet to be forwarded, wherein the packet to be forwarded comprises an IP message; in the IP message inserting network information of the first switching device and re-encapsulating the to-beforwarded packet to obtain the encapsulated packet, wherein the first switching device is a switching device receiving the to-be-forwarded packet; the second switching device, collecting network information in the encapsulated packet and sending the network information to the controller; subscribing to the computing power resource information of the computing power cluster and sending the computing power resource information to the controller; the first switching device, the second switching device and the core switching device construct a global network topology, wherein the global network topology includes multiple nodes; the network information plans a general routing table for each node; the network information and the computing power resource information plan a computing power routing table for each node; a request type in the packet to be forwarded matches a target routing path for the packet to be forwarded, wherein the target routing path is determined according to the general routing table or the computing power routing table.

In addition, the logical instructions in the memory 930 described above may be stored in a computer readable storage medium when implemented in the form of a software functional unit and sold or used as a stand-alone product. It may be understood that the technical solution of the present invention, or the part of it that essentially contributes to the prior art, may be embodied in the form of a software product, stored in a storage medium, comprising a number of instructions to enable a computer device (which may be a personal computer, a server, or a network device, etc.) to perform all or part of the steps of the method of each embodiment of the present invention. All or some of the steps of the method of each embodiment of the invention. The aforementioned storage media include: USB flash drive, removable hard disk, Read-Only Memory (ROM), Random Access Memory (RAM), disk or CD-ROM, and other media that can store program code.

On the other hand, the present invention further provides a computer program product, the computer program product comprising a computer program, the computer program being storable on a non-transitory computer readable storage medium, the computer program being executable by a processor, the computer being capable of executing the computing power routing method provided by each of the above methods, the method being applied to a computing power routing scenario, wherein the computing power routing scenario includes at least a first switching device, a second switching device, a core switching device, a controller, and a computing power cluster, the computing power routing method includes: receiving a packet to be forwarded, wherein the packet to be forwarded comprises an IP message; inserting network information of the first switching device in the IP message and re-encapsulating the packet to be forwarded to obtain an encapsulated packet, wherein the first switching device is a switching device receiving the packet to be forwarded; the second switching device, collecting network information in the encapsulated packet and sending the network information to the controller; subscribing to the computing power resource information of the computing power cluster and sending the computing power resource information to the controller; the first switching device, the second switching device and the core switching device construct a global network topology, wherein the global network topology includes multiple nodes; the network information plans a general routing table for each node; the network information and the computing power resource information planning a computing power routing table for each node; a request type in the packet to be forwarded matches a destination routing path for the packet to be forwarded, wherein the destination routing path is determined according to the general routing table or the computing power routing table.

In yet another aspect, the present invention further provides a non-transitory computer readable storage medium having a computer program stored thereon, the computer program being implemented to perform the computing power routing method provided by each of the above methods when executed by a processor, the method being applied to a computing power routing scenario, wherein the computing power routing scenario includes at least a first switching device, a second switching device, a core switching device, a controller, and a computing power cluster, the computing power routing method includes: receiving a packet to be forwarded, wherein the packet to be forwarded comprises an IP message; inserting network information of the first switching device in the IP message and re-encapsulating the packet to be forwarded to obtain an encapsulated packet, wherein the first switching device is a switching device receiving the packet to be forwarded; and the second switching device, collecting network information in the encapsulated packet and sending the network information to the controller; subscribing to the computing power resource information of the computing power cluster and sending the computing power resource information to the controller; the first switching device, the second switching device and the core switching device constructing a global network topology, wherein the global network topology includes multiple nodes; the network information plans a general routing table for each node; the network information and the computing power resource information plan a computing power routing table for each node; the request type in the packet to be forwarded matches the destination routing path for the packets to be forwarded, wherein the destination routing path is determined according to the general routing table or the computing power routing table.

The embodiments of the device described above are merely schematic, wherein the units illustrated as separate components may or may not be physically separated, and the components displayed as units may or may not be physical units, i.e., they may be located in one place or may be distributed to multiple network units. Some or all of these modules can be selected according to practical needs to achieve the purpose of this embodiment solution. It can be understood and implemented by a person of ordinary skill in the art without creative labor.

From the description of the above embodiments, it is clear to those skilled in the art that the respective embodiments can be implemented with the help of software plus the necessary common hardware platform, and of course by hardware. It is thus understood that the above technical solution, which essentially or rather contributes to the prior art, can be embodied in the form of a software product, which can be stored in a computer readable storage medium, such as ROM/RAM, disk, CD-ROM, etc., comprising a number of instructions to enable a computer device (which can be a personal computer, a server, or a network device, etc.) to perform the method of each embodiment or some part of an embodiment.

It is further understood that the embodiments of the present invention, although the operations are depicted in the accompanying drawings in a particular order, should not be construed as requiring that the operations be performed in the particular order shown or in serial order, or that all of the operations shown be performed to obtain the desired results. Multitasking and parallel processing may be advantageous in particular environments.

Finally, it should be noted that the above embodiments are only used to illustrate the technical solution of the present invention, not to limit it; despite the detailed description of the present invention with reference to the foregoing embodiments, it should be understood by a person of ordinary skill in the art that it is still possible to modify the technical solution recorded in the foregoing embodiments, or to make equivalent substitution of some technical features thereof; and these modifications or substitutions do not make the essence of the corresponding technical solution out of the spirit and scope of the technical solution of the embodiments of the present invention.

What is claimed is:

1. A method of computing power routing is characterized in that applied to a computing power routing scenario, wherein the computing power routing scenario includes at least a first switching device, a second switching device, a core switching device, a controller, and a computing power cluster, the computing power routing method comprising:
   receiving a packet to be forwarded, wherein the packet to be forwarded includes an internet protocol (IP) message;
   inserting network information of the first switching device in the IP message and re-encapsulating the packet to be forwarded to obtain the encapsulated packet, wherein the first switching device is a switching device receiving the packet to be forwarded;
   the second switching device collects the network information in the encapsulated packets and sends the network information to the controller;
   subscribing to the computing power cluster's computing power resource information and sending the computing power resource information to the controller;
   the first switching device, the second switching device, and the core switching device construct a global network topology, wherein the global network topology includes multiple nodes;
   using the network information to plan general routing tables for individual nodes;
   using the network information and the computing power resource information to plan computing power routing tables for individual nodes; and
   a request type in the packet to be forwarded matches a destination routing path for the packet to be forwarded, where the destination routing path is determined based on the general routing table or the computing power routing table.

2. The method of computing power routing according to claim 1 is characterized in that the request type comprises a content request type;
   based on the request type in the packet to be forwarded, matching the destination routing path for the packet to be forwarded, specifically including:
   in the case where the request type is the content request type, the general routing table matches the destination routing path for the packet to be forwarded.

3. The method of computing power routing according to claim 2 is characterized in that the general routing table includes multiple first target selectable paths;
   the general routing table matches destination routing paths for packets to be forwarded, specifically including:
   ranking the first target selectable paths according to link capacity of each first target selectable path from largest to smallest, wherein the link capacity is the capacity of a smallest edge in the first target selectable path; and
   the first target selectable path with a highest ranking is used as the destination routing path to match the packets to be forwarded.

4. The method of computing power routing according to claim 3 is characterized in that the network information plans the general routing table for each node, specifically including:
   using a depth-first search algorithm and a global network topology to construct a set of optional paths, where the set of optional paths includes multiple optional paths;
   using the optional paths to obtain the first target selectable paths; and
   using multiple first target selectable paths to get the general routing table.

5. The method of computing power routing according to claim 4 is characterized in that, before the optional path, the first target selectable path is obtained, specifically including:
   the network information determines a congestion node, wherein the congestion node is a node for which an information value corresponding to the network information exceeds a predetermined threshold;
   the optional paths are obtained for the first target selectable path, specifically including:
   the optional paths that contain congested nodes are eliminated to obtain the multiple first target selectable paths.

6. The method of computing power routing according to claim 1 is characterized in that the request type comprises a computing power request type;
   in case the request type is the computing power request type, the computing power routing table matches the destination routing path for the packet to be forwarded.

7. The method of computing power routing according to claim 6 is characterized in that the computing power routing table includes multiple second target selectable paths;
   the computing power routing table matches the destination routing paths for packets to be forwarded, specifically including:
   ranking the second target selectable paths in order of an average round-trip delay of each second target selectable path from smallest to largest; and
   the second target selectable path with a highest ranking is used as the destination routing path to match the packet to be forwarded.

8. The computing power routing method of claim 7 is characterized in that the network information and the computing power resource information plan the computing power routing table for each node, specifically including:
   obtaining multiple first target selectable paths in the general routing table, wherein the general routing table is determined based on the network information;
   based on the computing power resource information, determining an undesired business type, where the undesired business type is the business type whose average number of business visits is less than an access threshold during a preset period;
   unwanted business types identify the nodes to be excluded corresponding to the unwanted business types;
   the computing power resource information determines an overload node, wherein the overload node is a node whose load value exceeds a load threshold;
   eliminating the first target selectable path containing the nodes to be eliminated and the overloaded nodes to obtain the multiple second target selectable paths; and
   multiple second target selectable paths are obtained from the computing power routing table.

9. The computing power routing method of claim 1 is characterized in that the second switching device collects the network information in the encapsulated packet, specifically including:

in the case where the first switching device is an edge switching device, the second switching device forwards the encapsulated packets to a server gateway connected to the second switching device;

the server gateway parses the encapsulated packets and collects the network information in the encapsulated packets.

10. The computing power routing method of claim 1 is characterized in that the second switching device comprises a second programmable switching device;

the second switching device collects the network information in the encapsulated packet, specifically including:

in the case where the first switching device is the core switching device, the second programmable switching device parses the encapsulated packets and collects the network information in the encapsulated packets.

11. The method of computing power routing according to claim 1 is characterized in that sending the computing power resource information to the controller, specifically including:

encapsulating the computing power resource information using transport layer protocols to obtain encapsulated computing power resource information; and sending the encapsulated computing power resource information to the controller.

12. The method of computing power routing according to claim 11 is characterized in that the computing power resource information is obtained using that:

a control node in the computing power cluster publishes the computing power resource information of the computing power cluster to an autonomous domain gateway and a network service provider edge gateway in the computing power routing scenario.

13. A computing power routing apparatus is characterized in that it is applied to a computing power routing scenario, wherein the computing power routing scenario includes at least a first switching device, a second switching device, a core switching device, a controller, and a computing power cluster, the computing power routing device includes:

a first module for receiving packets to be forwarded, wherein the packets to be forwarded comprise IP messages;

a second module used to insert network information of the first switching device in the IP message and re-encapsulate the packet to be forwarded to obtain the encapsulated packet, wherein the first switching device is the switching device receiving the packet to be forwarded;

a third module for a second switching device that collects the network information in encapsulated packets and sends the network information to the controller;

a fourth module used to subscribe to computing power resource information of the computing power cluster and to send the computing power resource information to the controller;

a fifth module for the first switching device, the second switching device and the core switching device to construct a global network topology, wherein the global network topology includes multiple nodes;

a sixth module used for using the network information to plan general routing tables for individual nodes;

a seventh module used to plan computing power routing table for each node with the network information and the computing power resource information; and an eighth module used for using a request type in the packet to be forwarded to match a destination routing path for the packet to be forwarded, wherein the destination routing path is determined based on the general routing table or the computing power routing table.

14. An electronic device comprising a memory, a processor, and a computer program stored in the memory and runnable on the processor is characterized in that the processor executes the program to implement the computing power routing method as claimed in claim 1.

15. A non-transitory computer readable storage medium having a computer program stored thereon is characterized in that the computer program when executed by a processor implements the computing power routing method as claimed in claim 1.

* * * * *